US005995953A

United States Patent [19]
Rindtorff et al.

[11] Patent Number: 5,995,953
[45] Date of Patent: Nov. 30, 1999

[54] METHOD FOR VERIFICATION OF SIGNATURES AND HANDWRITING BASED ON COMPARISON OF EXTRACTED FEATURES

[75] Inventors: Klaus Rindtorff, Weil im Schoenbuch; Volker Rudolph, St. Maergen, both of Germany

[73] Assignee: International Business Machines Corporation, Armonk, N.Y.

[21] Appl. No.: 08/895,335

[22] Filed: Jul. 16, 1997

Related U.S. Application Data

[63] Continuation of application No. 08/198,975, Feb. 18, 1994, abandoned.

[30] Foreign Application Priority Data

Feb. 19, 1993 [EP] European Pat. Off. .............. 93102639

[51] Int. Cl.[6] .................................................. G06F 15/18
[52] U.S. Cl. ............................................ 706/20; 382/156
[58] Field of Search ........................ 395/23, 24; 382/156, 382/187, 186

[56] References Cited

U.S. PATENT DOCUMENTS

| | | | |
|---|---|---|---|
| 4,835,680 | 5/1989 | Hogg et al. ................................. | 706/20 |
| 4,914,708 | 4/1990 | Carpenter et al. ......................... | 706/20 |
| 4,941,122 | 7/1990 | Weideman ................................. | 706/20 |
| 5,052,043 | 9/1991 | Gaborski ................................... | 706/25 |
| 5,091,780 | 2/1992 | Pomerleau ................................ | 706/20 |
| 5,224,179 | 6/1993 | Denker et al. ............................ | 382/259 |
| 5,239,618 | 8/1993 | Yamaguchi et al. ....................... | 706/25 |
| 5,251,265 | 10/1993 | Dohle et al. ............................. | 382/123 |
| 5,251,268 | 10/1993 | Colley et al. ............................ | 706/20 |
| 5,274,743 | 12/1993 | Imondi et al. ............................ | 706/34 |
| 5,282,013 | 1/1994 | Gregoris ................................... | 356/4.07 |
| 5,293,456 | 3/1994 | Guez et al. ............................... | 706/20 |
| 5,303,311 | 4/1994 | Epting et al. ............................ | 382/197 |
| 5,317,675 | 5/1994 | Ikehara ..................................... | 706/25 |
| 5,333,210 | 7/1994 | Spirkovska et al. ...................... | 382/156 |
| 5,333,238 | 7/1994 | Kakazu et al. ............................ | 706/44 |
| 5,359,671 | 10/1994 | Rao ........................................... | 382/225 |
| 5,422,981 | 6/1995 | Niki .......................................... | 706/20 |
| 5,438,629 | 8/1995 | Moed et al. ............................. | 382/156 |
| 5,440,651 | 8/1995 | Martin ...................................... | 382/156 |
| 5,452,399 | 9/1995 | Moed ........................................ | 706/20 |
| 5,459,636 | 10/1995 | Gee et al. ................................. | 706/20 |
| 5,500,905 | 3/1996 | Martin et al. ............................ | 382/157 |
| 5,533,383 | 7/1996 | Greene et al. ............................ | 706/20 |
| 5,544,257 | 8/1996 | Bellegarda et al. ...................... | 382/187 |
| 5,588,073 | 12/1996 | Lee et al. ................................. | 382/187 |
| 5,636,291 | 6/1997 | Bellegarda et al. ...................... | 382/187 |

FOREIGN PATENT DOCUMENTS

| | | |
|---|---|---|
| 0395068 | 4/1990 | European Pat. Off. . |
| 483391 | 10/1990 | European Pat. Off. . |

OTHER PUBLICATIONS

Gerhard Urban, "Advanced Image Processing for Future Use in Space Systems Automation", IECON, IEEE 1991.

Beglou et al, "Off–line Cursive–script Recognition Using a Neural Network", Digital Processing of Signals in Communications, IEE Conference, 1991.

S. M. Lucas & R. I. Damper, 'Signature Verification with a Syntactic Neural Net', IEEE International Joint Conference on Neural Networks, vol. 1, Jun. 17–21, 1990, pp. I–373–I–378.

J. G. McWhirter et al, 'A Systolic Array for Nonlinear Adaptive Filtering and Pattern Recognition', Journal of VLSI Signal Processing, vol. 3, No.1/2, Jun. 1991, pp. 69–75.

*Primary Examiner*—Robert W. Downs
*Attorney, Agent, or Firm*—K. O. Hesse

[57] ABSTRACT

This invention describes a technology to improve the feature based comparison of images. The images are captured and their significant features are extracted. For a comparison only the feature values have to be compared instead of the images themselves. This leads to a significant reduction of storage space and calculation time needed. The reliability of the comparison is improved greatly by including also the individual variation ranges of the feature values and using a specialized neural net for classification.

4 Claims, 3 Drawing Sheets

Ia

Ib

Ic

II

III

METHOD FOR VERIFICATION OF SIGNATURES AND HANDWRITING BASED ON COMPARISON OF EXTRACTED FEATURES

The application is a continuation of application Ser. No. 08/198,975, filed Feb. 18, 1994, now abandoned.

BACKGROUND OF THE INVENTION

1. Field of the Invention

The invention relates to a method for verification of signatures and handwriting which includes a neural net for image recognition.

2. Description of Related Art

There are two general principles for comparison of handwriting and signatures, the dynamic and the static comparison. For a dynamic verification, like the biometrics based verification in the IBM Transaction Security System, the originator must be physically present. The static approach can be used also in environments where an image of a signature or handwriting must be checked without the physically present originator, for example cheque processing.

A simple image comparison matches the two given images on a picture element basis. This may include a sizing and rotation operation to compensate differences in image resolutions and skews. In this case it is very hard to compensate variations in the geometry of the image contents itself without adulterating it. A simple feature comparison will be achieved by comparing the sample features against the reference features and calculating the difference between them. The identification of a measurement is the main problem in that case.

An example of a technique based on the extraction and comparison of significant features and starting point of the present invention is the one described in EP-A-0 483 391. The feature extraction leads to a significant reduction of storage space and calculation time needed. For the image capture process a scanner or a touch-sensitive device can be used. From the binary representation of the rastered image, the actual features are computed and combined to a vector of feature values, called a feature set. For a comparison of two images only the two feature sets are compared. The image information is not needed any longer. To compare two feature sets, each feature is compared and weighted separately. To find good weightings for this comparison is extremely difficult. For that, an artificial neural net approach can be used. The arithmetic differences between each two corresponding features from all features of the feature sets is calculated and fed into the neural net. There they are weighted internally and an output is calculated which gives a value to be interpreted as the probability whether the two images match. A well trained neural net will be able to classify not only images used during training but also those which are presented the first time at all. Using a state of the art artificial neural network, like the multi-layer perceptron, to compare two sample images, recognition rates up to 95 percent have been achieved.

SUMMARY OF THE INVENTION

It is an advantage of the present invention to improve the recognition rate considerably and to enhance the security with which e.g. signatures can be verified as true or false. Furthermore it is an advantage of the present invention to specialize a neural net in such as way that it can be used favorably in connection with the verification method of the present invention. Further favorable embodiments are contained in the associated subclaims.

BRIEF DESCRIPTION OF THE DRAWINGS

The invention is subsequently described in more detail in connection with the drawing, in which.

DETAILED DESCRIPTION

Figure 4:
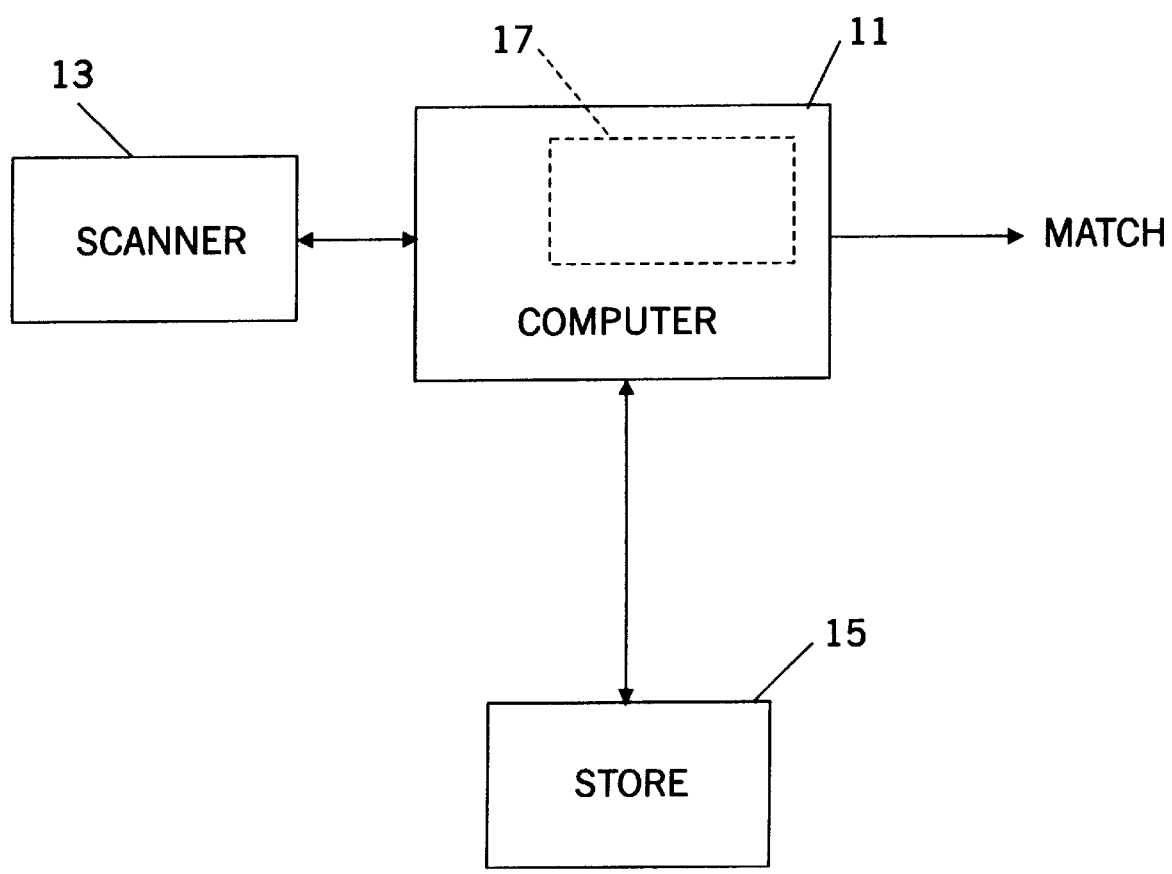
FIG. 4 shows a block diagram of a computer system implementing the invention.

Referring first to FIG. 4, a computer 11, scanner 13 and store 15 are shown as described herein for the extraction and comparison of image features. Neural net 17 is shown as a part of the computer 11 and accomplishes the comparison.

Figure 1:
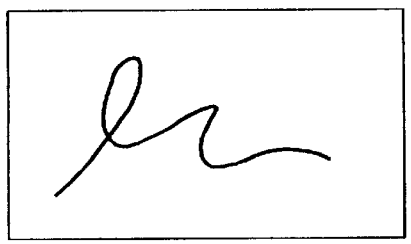
FIG. 1 shows different signature images used for demonstrating the method of the present invention.
Figure 1:
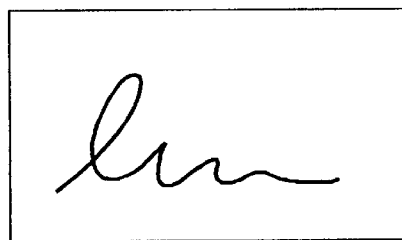
Figure 1:
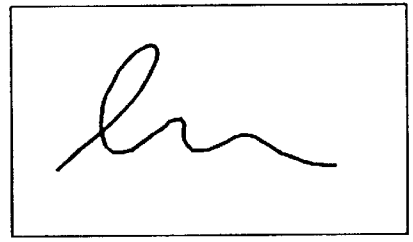
Figure 1:
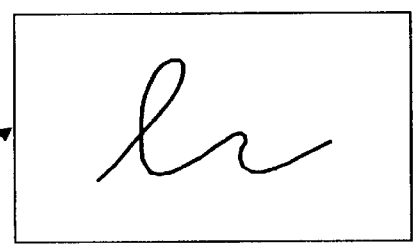
Figure 1:
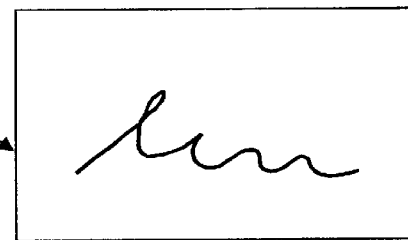

To improve the quality of the decision that can be reached even further, additional feature information must be added. Given the scanning by scanner 13 of two signatures or handwritten samples from two different originators, the first may match the style of the second because a sufficient number of extracted features fall into the same range. Nevertheless the second one may not match with the first one because feature values are outside the typical ranges. If for example only the signature Ib from FIG. 1 is known and compared against signatures II and III, signature III might match better against Ib than II matches Ib. But if more original signatures Ia and Ic are known, the decision should be that signature II matches Ib better than III. Based on features, such a decision can only be made if not only the features from the actual image, but as provided by the present invention also typical feature ranges, called variation ranges, for those features are known. Those variation ranges will be different for each reference feature set. The computer II comparison can then be made using the actual feature values and the variation ranges in which these features may vary. This leads to a significant increase in the recognition rate with only few new information. In the case of signature classification, recognition rates over 99 percent have been achieved. The variation ranges can be calculated using a limited set of image examples which are stored in store 15 with the reference image and used to calculate actual ranges again after each comparison. The calculation of the moving average for a limited set of values will suffice here.

The update process of the feature variation ranges can be stopped after a sufficient reference feature set has been found. It may also be continued using each qualified sample available. This will guarantee, that each sample feature set is matched against a reference feature set which best represents the typical feature values and their variations. It will also make the whole process independent from the very slow variation in handwriting which each individual shows over the years.

MODIFIED NET INPUT WEIGHTING

In accordance with the second aspect and advantageous embodiment of the present invention, a new weighting scheme is incorporated into the used neural net 17. Multi-layer perceptrons are constructed in several layers consisting of nodes. The first layer is called the input layer. The output value of a input node itself is initialized with the actual input value presented to that node. Now there are actually three values per input node because instead of presenting the arithmetic differences between two feature values to the input nodes, both feature values and additionally the variation range of the reference feature are used. Those three values must be combined to a single node value. For that each sample feature value will be compared against its corresponding master feature value regarding the given variation for this feature. This new process, called the input layer pre-weighting, uses the variation range to calculate a distance value for the sample feature. This becomes the new output of the input node.

The function to calculate the distance value should have its extremum for two equal feature values. Each feature may have its own specialized function for that purpose. This function may be calculated by:

$$\frac{1}{1 + \frac{abs(S-R)}{V}} \quad \begin{array}{l} S: \text{ Feature value from Sample} \\ R: \text{ Feature value from Reference} \\ V: \text{ Feature range from Reference} \end{array}$$

There can be identified two classes of features representing values from geometric and stylistic information in the image. Both features are supplementary and will be used together. Because of their nature, geometric features will be most often implemented as a vector of values describing the measurements from several points of the image. Stylistic features will be given in most cases as scalar values.

Geometric features describe the geometric nature of the image. For that, positions and intensities of significant parts of the parameters are identified. Examples are the number and height of density peaks in the horizontal or vertical direction of the image. Those features are definitely dependant from the actual text written.

Stylistic features include those who describe the style of the writing. They are calculated from parameters which are position independent or are results of calculations using combination of those parameters. Examples are the typical gap width between characters or the slant and the relative length in which characters or parts of the text are written. Those features are independent of the actual text written.

SCALAR AND GEOMETRIC FEATURES

Figure 2:
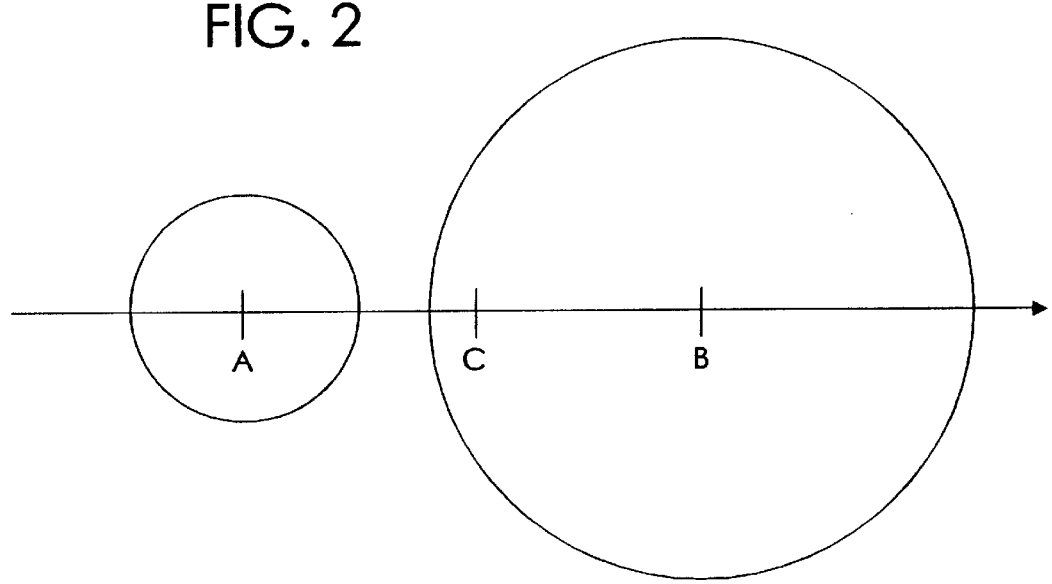
FIG. 2 shows different variation ranges of two different features.

To implement the individual feature variation ranges, the statistical standard variation is calculated for each feature and stored along with the average value of each feature. It must be mentioned that the comparison is no longer symmetric now. There must be distinguished between the sample feature set coming from a sample image and a reference feature set coming from a reference image against which the sample is compared. Given the average value for a single sample feature denoted as point C in FIG. 2, the distance to two other average feature values denoted A and B is the same. But regarding the variation ranges, indicated by circles of different radii, of the feature values A and B, the sample feature value is inside the range of B but outside the range of A. Thus it belongs more likely to A than to B.

In the case of scalar features the ranges are updated after the comparison. The new feature average value is weighted and afterwards added to the also weighted previous average value. The variation range is updated analogously. If no sample images are known before the first comparison, the variation ranges is initialized with zero. Given an adjustment factor to control the feature tracing speed, the new scalar feature values R' are calculated using the formula:

$$R'=A*S+(1-A)*R$$

R: Feature value from Reference
S: Feature value from Sample
A: Adjustment factor between 0 and 1

The new scalar feature ranges V' are calculated using the formula:

$$V' = \sqrt{A*(S-R)^2 + (1-A)*V^2}$$

R: Feature value from Reference
V: Feature range from Reference
S: Feature value from Sample
A: Adjustment factor between 0 and 1

In case of geometric features the calculation of an average is not meaningful. The average feature value has to be replaced by a typical feature value. Given a function which determines a value representing the quality of a match for two geometric feature vectors, the typical feature vector can be found. Each sample feature vector is compared against each other given sample and the one which matches best with all other samples is determined. Now the feature variation range can be replaced by the average match value of this vector against each other.

VECTOR COMPARISON

To compare two vectors, a special function is used. Both vectors must be normalized and represented by an arbitrarily large number of columns like shown in FIG. 3. If the number is too low, the comparison is not precise enough. If it is too high, small variations are weighted too high. A good number for this application is 25 columns.

Figure 3:
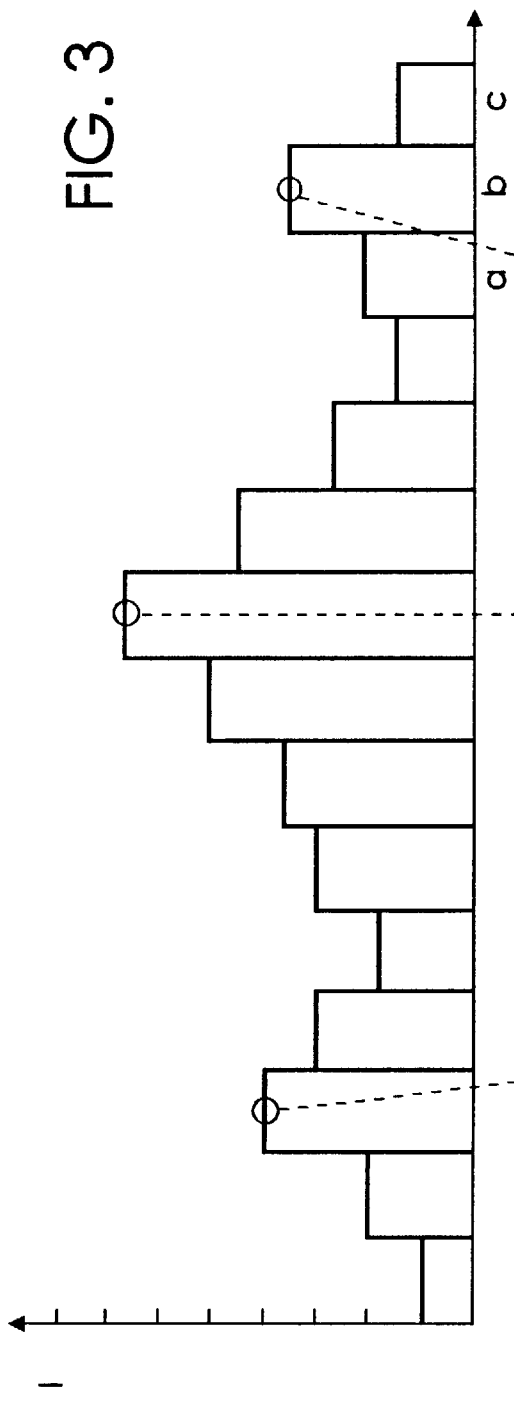
FIG. 3 shows a diagram demonstrating how two vectors are compared.
Figure 3A:
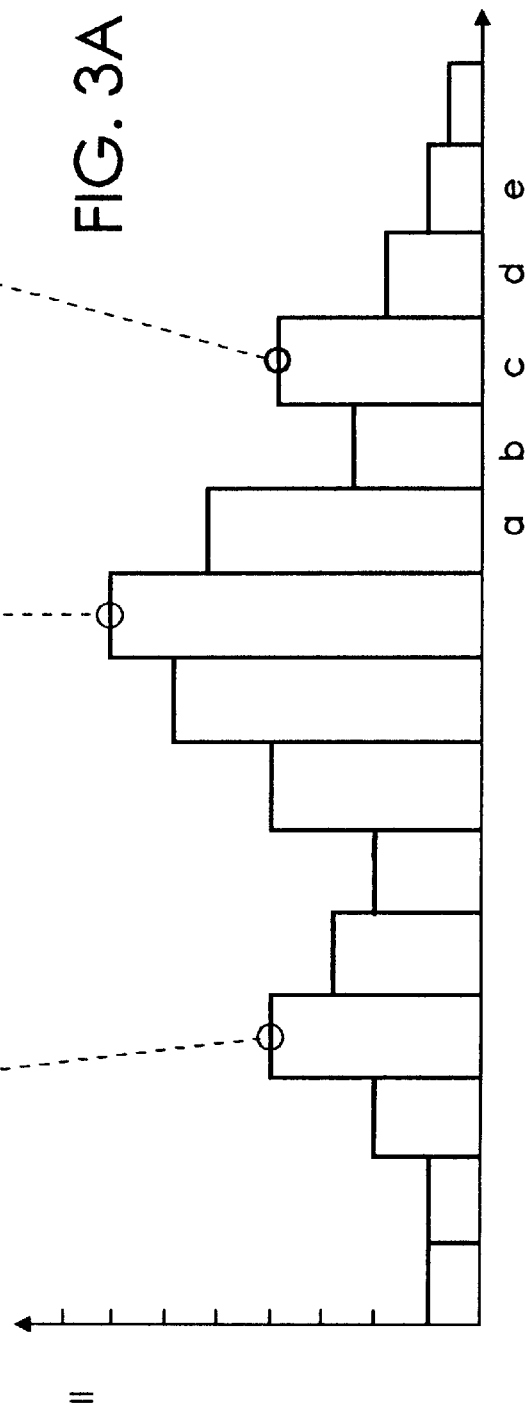

The function which is used to compare the two feature vectors is implemented using a pattern matching algorithm. It searches for corresponding values in the two vectors I and II as shown in FIG. 3, to compensate for shifts and stretching. To find the corresponding column for a given column, like those marked by dotted lines in FIG. 3, it's two nearest neighbors are included for the first match. Those three Ia, Ib, Ic for example, are compared against their counterparts in the second vector, e.g. IIb, IIc, IId in this example. The total distance is calculated by the sum of the absolute values of the three column differences. The same three columns Ia, Ib, Ic are also matched against the three counterparts in the second vector after shifting it one column to the right IIa, IIb, IIc and against the three columns after shifting the second vector one column to the left, Iic, Iid, IIe.

The match with the minimum total distance gives the shift to use when calculating the final error for one column match. This error is squared and accumulated over all columns. For that reason the vector values must first be normalized in a way that the maximum average error which will be allowed during vector comparison is 1. At the end, the quotient between the average column error over all columns and the squared maximum allowed error is computed. This will result in a reduction of errors less than the maximum allowed error and in an amplification of errors greater than the maximum allowed error. This way greater errors can not be easily compensated by smaller ones. To make the vector comparison symmetric, the whole process is repeated with the two vectors swapped. The average of the two results is returned as the comparison result.

THE NEURAL NET

Using the techniques provided by the invention, a very small neural net can be used as a feature cooperator. The neural net used in this application is a standard feed-forward multi-layer artificial neural net trained with the back-propagation algorithm. Each input node of the net is reserved for a single feature. The pre-weighting is done in the input node to combine the reference and the sample value and the known variation range into a single scalar value. This way the net dimensions can be kept small. A typical net for this application would consist of 20 input nodes, two hidden layers and one output node.

During the training process two feature sets are fetched from a feature data base. These are pairs from the same and from different authors, presented in an alternating sequence. They are randomly chosen from the data base. This way there is no fixed training set and the risk of over-fitting is sufficiently small.

The cooperator performance can be described by two values, the false accept rate and the false reject rate. By changing the alteration scheme one of both rates may be improved for the cost of some degradation of the other one. This is done by applying more samples from the class of matching feature sets than from the class of non-matching feature sets. After some training time the intended improvement can be measured. So the training process can be controlled to match the cooperator requirements for a given application.

APPLICATIONS

The variation ranges and the pre-weighting technique in accordance with the present invention can be used for all comparisons where individual variations for a set of reference features can be found. The pre-weighting function may also be used with a standard classification algorithm instead of an artificial neural network.

The technique can be used to compare the features of a sample image of a signature, captured from a payment document for example, against the features of a reference image from a database. This can help to automate the process of signature verification in cheque processing.

It may also be used to help the operator to find the best matching signatures for accounts where one or more specimens from a set of signatures from different persons are allowed. This will greatly ease the manual verification of cheques for corporate accounts.

Security applications can use this technique to identify a person, given the signature or a piece of handwriting. Because of the small storage amount needed for the features, they may be stored in the magnetic stripe of a credit card or an identification card. In that case the signature on the card is not required any longer. A stolen or lost card can not as easily be misused, because the signature is not visible on the card itself and can therefor not be forged.

Identification of a person using this technique is not restricted to the signature. A password may also be used here. For the identification process, the password must be known and the person's typical handwriting must be matched.

Given two different pieces of handwriting, the probability whether both are written by the same person can be calculated. This may be used for document verification or to identify the author of a handwritten text.

Given a representative set of sample images, the neural net can be retrained and that way adapted to different cultural writing habits.

Transferring the technique of the present invention to the automated processing of documents, it can be used to identify the sender by comparing the typical logo in the letter head against a list of known logos. It can also be used to classify the printed form to make use of information about the location of data fields before starting a character recognition process. In summary it has to be stressed that the technique as described by the present invention greatly improves comparisons between a sample feature set and a reference feature set by using their variation ranges and a pre-weighting function. The vector comparison method calculates scalar results for the comparison of two vectors. This allows to keep the number of inputs to the neural net cooperator very low and thus improves the speed and the ease of training. When used with features extracted from signature images, it significantly improves the reliability of an automatic signature verification.

We claim:

1. Multi-layer neural net computer for comparing features from a sample image and a stored master reference, comprising:

an image input to said computer for capturing said sample image;

a store communicating with said computer for storing said master reference; and a multi-layer neural net further comprising:

an input layer of said net wherein input to each node in said layer includes a feature value from said sample image to be verified, a feature value from said stored master reference, and a feature range value from said stored master reference; and wherein output from each node in said layer includes a distance value for the sample image feature value wherein said distance value is calculated from said input to each node.

2. Multi-layer neural net computer as in claim 1, wherein said distance value is computed by a function having its extremum for two equal feature values.

3. Multi-layer neural net computer as in claim 2, wherein said function is computed according to the formula $$\frac{1}{1+\frac{\text{abs}(S-R)}{V}}$$

wherein
abs is the absolute value of S–R,
S is the feature value from the sample image,
R is the feature value from the stored master reference, and
V is the feature range value from the stored master reference.

4. Multi-layer neural net computer as in claim 1, wherein features are contained in two classes representing values from geometric and stylistic information in the image.

* * * * *